United States Patent
Schowalter et al.

(10) Patent No.: US 9,400,820 B2
(45) Date of Patent: Jul. 26, 2016

(54) DATA-LOADING SYSTEM, TRANSPORTABLE DATA-LOADING DEVICE, AND A METHOD FOR LOADING SOFTWARE CONFIGURATIONS INTO AIRCRAFT

(71) Applicant: LUFTHANSA TECHNIK AG, Hamburg (DE)

(72) Inventors: Joerg Schowalter, Alsheim (DE); Matthias Fliegner, Frankfurt (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 166 days.

(21) Appl. No.: 14/353,250

(22) PCT Filed: Oct. 16, 2012

(86) PCT No.: PCT/EP2012/004313
§ 371 (c)(1),
(2) Date: Apr. 21, 2014

(87) PCT Pub. No.: WO2013/056810
PCT Pub. Date: Apr. 25, 2013

(65) Prior Publication Data
US 2014/0258257 A1 Sep. 11, 2014

(30) Foreign Application Priority Data
Oct. 20, 2011 (DE) .......................... 10 2011 122 761

(51) Int. Cl.
*G06F 17/00* (2006.01)
*G06F 17/30* (2006.01)
*G06F 9/445* (2006.01)

(52) U.S. Cl.
CPC ............ *G06F 17/30386* (2013.01); *G06F 8/61* (2013.01)

(58) Field of Classification Search
CPC ..... G06F 11/3013; G06F 13/10; G06F 13/20; G06F 13/28; G06F 13/4221; G06F 17/18
See application file for complete search history.

(56) References Cited

U.S. PATENT DOCUMENTS

| 2006/0229772 | A1 | 10/2006 | McClary |
| 2010/0268698 | A1* | 10/2010 | Cases .................. G06F 8/65 707/695 |
| 2011/0167420 | A1 | 7/2011 | Bastien |

FOREIGN PATENT DOCUMENTS

WO WO-2010/029250 3/2010

OTHER PUBLICATIONS

Teledyne Controls, "PDL-615/MSD, Portable Data Loader—Mass Storage Device," pp. 1-2.

*Primary Examiner* — Truong Vo
(74) *Attorney, Agent, or Firm* — Saliwanchik, Lloyd & Eisenschenk

(57) ABSTRACT

The invention relates to a data-loading system and a corresponding method for loading software configurations into the electronic components of aircraft, said data-loading system comprising a databank system and a least one transportable data-loading device. Software configurations for at least one fleet of aircraft are stored in the databank system, and said data-loading device is configured to load, via a port, an allocated software configuration that has been obtained from said databank system into a data bus of an aircraft which corresponds to this software configuration. Said data-loading device is configured to load the latest individual software configurations of all of the aircraft of the fleet, from the databank system, and to store these on said data-loading device, this loading process taking place at a ground-based storing position by means of a data connection.

20 Claims, 2 Drawing Sheets

DATA-LOADING SYSTEM, TRANSPORTABLE DATA-LOADING DEVICE, AND A METHOD FOR LOADING SOFTWARE CONFIGURATIONS INTO AIRCRAFT

CROSS-REFERENCE TO RELATED APPLICATIONS

The present application is the U.S. National Stage Application of International Patent Application No. PCT/EP2012/004313, filed on Oct. 16, 2012, which claims priority to German Patent Application No. 10 2011 122 761.3, filed on Oct. 20, 2011, both of which are hereby incorporated by reference herein in their entirety, including any figures, tables, or drawings.

The invention relates to a data-loading system for loading software configurations into the electronic components of aircraft, the data-loading system comprising a database system and at least one transportable data-loading device and software configurations for at least one fleet of aircraft being stored on the database system. The data-loading device is configured to load an assigned software configuration obtained from the database system via a connection into a data bus of an aircraft corresponding to said software configuration. The invention also relates to a corresponding data-loading device and a data-loading method.

In modern aircraft a plurality of electronic components are installed which implement a program or operating system stored in the electronic components to enable them to perform their respective function. Said electronic components can be flight control systems, radio and radar systems for example. Furthermore, electronic components are installed into aircraft, which, in addition to a program, need to have access a plurality of data to perform their function in the aircraft, such as for example access to navigation systems which have to be updated regularly with the latest information about changes to radio navigation beacons, airports etc. The majority of electronic components are therefore subject to at least one software update during their period of use; components which access software with information from data bases are updated much more frequently.

As it is impractical to remove the electronic components individually out of the aircraft to perform an update and implement the relevant changes or updates in a workshop, said components can generally be provided with updated or improved programs and/or updated database information in their installed state. The electronic components of an aircraft are generally connected to one another by a data bus, which can be used for loading the changes, so that access from the outside to the electronic components only needs to be provided at one or a few points in the aircraft.

The updates or changes of software for electronic components of an aircraft are made available to the operator of the aircraft or an aircraft fleet by the aircraft manufacturer, the manufacturer of the individual electronic components or others as software packages.

A set of software packages for a software update is planned by the operator or the maintenance operation of the fleet of aircraft. The software updates are compiled for the individual electronic components so that a new software configuration is prepared for an aircraft. The software configurations are often different for each aircraft, even for aircraft of the same model, owing to the various different states of construction or overhaul or maintenance, which means that there are a plurality of different software configurations for one fleet.

The software configurations to be loaded into an aircraft are extremely critical to safety because of their relevance to flight safety, which means that clearance of the software configurations, verification and special care are required for version maintenance. Furthermore, the operator on the ground needs to be able to check and verify at any time the latest software configurations of an aircraft during operation on the basis of official regulations.

The various latest or planned software configurations are typically collected and held on a database system, e.g. a server, of the aircraft operator or the maintenance operation. Furthermore, the necessary clearances for the use of a specific software configuration are also provided for each aircraft.

The software configuration is prepared for transfer to the aircraft after the creation of a work order. Data carriers are used for this and for this order are loaded with the corresponding software configuration, generally the latter are disks, CDs or other data carriers.

For loading the software configuration of data carriers into the aircraft a data-loading device or also a data loader are necessary which can read the corresponding data carrier or carriers and can transfer into the bus system or the data bus of the aircraft. The data-loading device can be configured in this case to be transportable so that it can be used in different aircraft, or can be installed permanently in the aircraft as a data loader. By means of the data bus the software updates can be transferred as the new software configuration of the aircraft to the individual electronic components of the aircraft.

To change or update the software configuration of the respective aircraft it is necessary to create a plurality of data carriers, which is very time-consuming. In addition, the management, distribution and tracking of said data carriers are also very time-consuming, as owing to the importance of air traffic safety a special degree of verification is necessary.

The object of the invention is to provide a device and a corresponding method which enable the efficient and secure loading of software configurations into aircraft with reduced effort.

Said object is achieved by the features of the independent claims. According to the invention the data-loading device is set up in a ground-based storage position to load via a data connection the latest individual software configurations of all of the aircraft of at least one fleet from the database system and to store them on the data-loading device (without media breaks).

The data-loading system comprises a transportable data-loading device which has the latest software configurations of a plurality of aircraft, and for loading new software configurations is conveyed into the aircraft and connected there to the data bus of the aircraft. An operator of the data-loading device selects the corresponding software configuration for said aircraft and starts the loading process, so that all of the electronic components to be updated can be updated without inserting or changing data carriers in the data-loading device.

The data-loading system/method according to the invention is advantageous because there is no need to create, distribute and manage the data carriers. The risk of human error is reduced during the updating process. Furthermore, the whole loading process is also accelerated inter alia by omitting the exchange of data carriers, so that the work time required for loading process is considerably reduced. Errors caused by defective data carriers are also prevented.

Furthermore, the data-loading system according to the invention is advantageous, because in this way a closed data-loading system is created which reduces the risk of operating errors during the loading process and in the work preparation. The entire preparation is simplified because there is no need to create and manage data carriers.

Preferably, the respective software configuration to be loaded via the connection into the data bus of an aircraft can be selected by an operator via a user interface of the data-loading device. The operator can in this way very easily select the software configuration defined in the work order via a screen-controlled menu. It is not necessary to select corresponding data carriers and maintain the sequence when inserting and changing the data carriers into a conventional data-loading device.

The data-loading device of the data-loading system is preferably set up to identify an aircraft when it is connected to a data bus of said aircraft. In this way the corresponding software configuration can be suggested to an operator, whereby user errors relating to the selection of the software configuration can be reduced. In this way there is an additional level of control which increases safety.

In one embodiment the data-loading device can be set up, after connection to a data bus of an aircraft, to automatically load the corresponding software configuration for said aircraft into the electronic components of said aircraft. After connecting to the aircraft the data-loading device recognises the connection to a data bus and identifies the corresponding aircraft. If a newer version is available on the data-loading device this is automatically loaded into the aircraft. This accelerates the updating process and simplifies handling for the operator. The invention is not limited to this however, but also includes the manual entry of the identification code for example.

In an advantageous embodiment the data-loading device is configured, in the storage position, to transfer an automatic feedback response about the implemented loading processes of software configurations to the database system. The manual feedback response of the operator by a signed work card or a signed work order to the configuration monitoring service of the aircraft fleet is additionally secured by a digital protocol. In this way the actually transferred data can be verified digitally, e.g. by duplication of the transferred data. The data transfer of a software configuration from the database system to an aircraft is in this way a closed process after the clearance of the software configuration by a planning station, which largely excludes the human error factor. Furthermore, it is possible to verify efficiently software updates of a large number of individual electronic components of an aircraft, which is becoming ever more important for modern aircraft with an increasing number of electronic components.

Preferably, the data-loading device is configured to periodically load the latest individual software configurations of all of the aircraft of at least one fleet from the database system via the data connection. This is advantageous because a data-loading device of the data-loading system in this way has the latest, available software configurations without manual intervention, so that for each aircraft of the fleet the software configuration is available for a planned software update. Furthermore, in this way a plurality of data-loading devices can be used in the data-loading system, as all of the data-loading devices are provided with the respective latest software configurations for all of the aircraft of the serviced fleet without further manual intervention.

Preferably, the interval for periodically loading the latest individual software configurations of all aircraft of the fleet can be adjusted by the database system. The interval is advantageously selected so that a cleared software configuration is loaded in good time before maintenance work is carried out and thus before the removal of the data-loading device from the storage position. Typically an interval is selected of between ten seconds and one hour.

In an advantageous embodiment the data-loading system comprises only cable connections for the transfer of data between the database system and data-loading device and between the data-loading device and aircraft. A cable connection is characterised by having a higher data transfer rate than wireless data transfers. It is particularly important with regard to concerns about the technical safety of the software configurations for flight safety that the cable connections enable a closed data-loading system, which cannot be disrupted, manipulated or intercepted externally by a third party without physical access. This is particularly advantageous compared to radio-based data transfers which can be infiltrated much more easily by unauthorised persons, as in this case no physical or mechanical access is necessary to the data-loading system, the data-loading device or the aircraft.

In a further advantageous embodiment the data-loading system is configured to transmit a software configuration from the transportable data-loading device via a connection by a data loader installed in an aircraft into a data bus of said aircraft. Some aircraft have a permanently installed data loader, via which software configurations can be transferred into the bus system of the aircraft. Said installed data loaders are always on board the aircraft and are used for loading software configurations of data carriers. They are no longer absolutely necessary for the use of mobile data-loading devices, but are still not removed from the aircraft in every case. The transfer of the software configuration by the data-loading system can in this case be performed by the permanently installed data loaders. For reasons of efficiency a data loader permanently installed on board can be removed, as said data loader is surplus to requirements when loading by means of a mobile data loader. The reduction in weight can possibly save fuel costs and $CO_2$ emissions can be reduced.

For example, if the aircraft has a permanently installed data loader and no independent connections to a data bus of the aircraft are used, it can be advantageous to transfer the software configuration from the transportable data-loading device of the data-loading system according to the invention firstly into the permanently installed data loader, or to load the software configuration via the permanently installed data loaders into the aircraft. The advantages of the data-loading system according to the invention are maintained in this case.

The data-loading system comprises in an advantageous manner a ground-based software management system for the database system, which enables an electronic configuration check of the software configurations of aircraft, so that the detection, monitoring and verification of the software configurations of the aircraft of at least one fleet can be performed by the data-loading system. The electronic configuration check by the software management system of the data-loading system is much less prone to error with its simpler handling and the high potential level of automation than manually controlled lists, drawings and databases.

Furthermore, the object of the invention is achieved by a transportable data-loading device for loading software configurations into the electronic components of aircraft, which is configured to load an assigned software configuration obtained from a database system via a connection into a data bus of an aircraft corresponding to said software configuration. According to the invention the transportable data-loading device is configured to load in a ground-based storage position the latest individual software configurations of all of the aircraft of at least one fleet from the database system via a data connection and store them onto the transportable data-loading device. The transportable data-loading device according to the invention has a much broader function than simply to load data into an aircraft and enables a simplified, more rapid and more easily controlled data-loading process of software configurations for aircrafts, which has an advantageous effect on the maintenance costs and flight safety.

The object of the invention is also achieved by a method according to the features of the last claim. According to the invention the data-loading device in a ground-based storage position loads the latest individual software configurations of all of the aircraft in at least one fleet from the database system via a data connection and stores said software configurations on the data-loading device. The method according to the invention simplifies and accelerates the loading of software configurations and improves the operating safety of aircraft.

The invention is explained in the following by way of preferred embodiments with reference to the attached Figures, in which.

Figure 1:
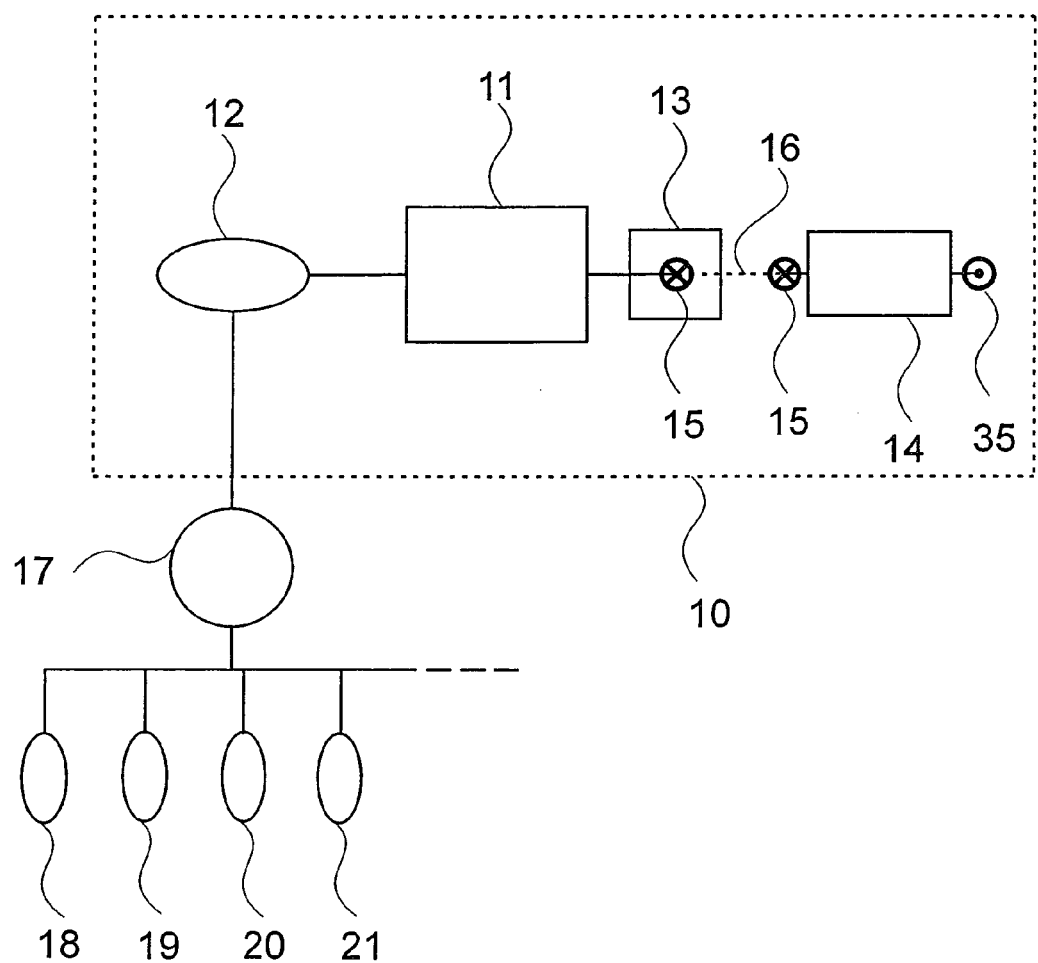
FIG. 1 shows a schematic representation of the data-loading system with a data-loading device in the storage position.

FIG. 1 shows an exemplary embodiment of a data-loading system 10 with a database system 11, wherein the database system 11 has a connection to at least one storage position 13 for a transportable data-loading device 14. The transportable data-loading device 14 is connected via data-loading connections 15 by a cable-connected data connection 16 to the storage position 13 and thereby to the database system 11.

A software configuration 12 is put together by a planning station 17 from individual or combined software packages 18, 19, 20, 21, . . . planned and cleared for the transfer of data to an aircraft 30. The planning station 17 is in this case the place responsible for the maintenance and/or operating safety of the aircraft 30, and can be manned by a maintenance engineer for example. At the planning station 17 all of the maintenance procedures for the aircraft 30 can also be planned. The clearance of a software configuration 12 can also be performed here, which is particularly important from the point of view of air traffic regulations. In one possible embodiment the planning station 17 can use a ground-based software management system for the database system 11.

The software configuration 12 is made up of individual software packages 18, 19, 20, 21, . . . for the various electronic components 38, 39, 40, 41, . . . of an aircraft 30, which are provided by the respective manufacturers or service providers. It is divided into updates of the operating software e.g. of flight control or autopilot, and database information, such as e.g. charts, radio frequencies and the landing procedures of airports.

The software packages 18, 19, 20, 21, . . . are limited to the number of electronic components 38, 39, 40, 41, . . . used in the aircraft 30, which can be loaded with updated software packages 18, 19, 20, 21, . . . via the data bus 33. During a software update, however, it is not absolutely necessary to update all of the available electronic components.

The storage position 13 of a transportable data-loading device 14 is a ground-based position or an area which has suitable space for depositing the transportable data-loading device 14 and a data-loading connection 15. Typically the storage position 13 is arranged in the region of the operating device output for the maintenance and servicing of the aircraft. Next to a data-loading connection 15 in the storage position 13 a device can be provided for loading the energy storage device of the data-loading device 14. The data-loading system 10 is not limited to a storage position 13; a plurality of storage positions 13 can also be used which can also be allocated to a plurality of maintenance sites. Typically the maintenance sites are at airports. Preferably, all of the storage positions 13 are connected to the same database system 11 of the data-loading system 10 and the connection can also be made in special circumstances via intermediate stations. The allocated storage positions 13 can make it possible to perform at short notice a worldwide update of the software configurations 12 of the aircraft 30 of at least one fleet. An update of database information stored in an aircraft 30 is prescribed for example for specific software variants every 28 days.

The database system 11 comprises in a typical embodiment a central server onto which all of the latest or planned individual software configurations 12 can be stored for at least one serviced fleet of aircraft 30. The database system 11 manages, secures and controls access to the software configurations 12.

The data-loading device 14 is a transportable data-loading device 14, which has a sufficiently large data memory and can load and store software configurations 12 for a plurality of aircraft 30 via a data connection 16 in a storage position 13. Advantageously, the data-loading device 14 has a screen and input devices for an operator, such as e.g. a keyboard, mouse, touchpad or touchscreen.

The data connection 16 to the database system 11 via the storage position 13 can be performed for example via the Ethernet and a suitable data transfer protocol. The data-loading connections 15 can consist of standard connection boxes for data cables. Furthermore, it is possible that a data cable, for example, is connected permanently to the connection 15 in the storage position 13.

In a typical loading procedure using the data-loading system 10 the individual software packages 18, 19, 20, 21, . . . or software and/or database updates are made available to the operator and/or maintenance service of a fleet of aircraft 30 at different time points. The planning engineer at the planning station 17 selects the relevant software packages 18, 19, 20, 21, . . . for a specific aircraft 30; the selection is made on the basis of the individual configuration of the electronic components 38, 39, 40, 41, . . . in said aircraft 30 and the corresponding state of construction of the aircraft 30, e.g. with regard to the electronic components 38, 39, 40, 41, . . . or versions of the different electronic components 38, 39, 40, 41, . . . , which are installed in the aircraft 30. The software configuration 12 is set up for a software update as part of a planned or unplanned maintenance interval. After setting up, checking and clearing for transfer to the corresponding aircraft 30 the software configuration 12 is made available on the database system 11 of the data-loading system 10. The software configuration 12 to be loaded into the aircraft 30 is thus defined and is available centrally on the database system 11.

A data-loading device 14 is connected in one storage position 13 to the database system 11, preferably downloads periodically at an update interval the newly available software configuration 12 and stores said software configuration on its storage medium. The interval for loading the current individual software configurations 12 can be selected as desired, however an interval is preferred which enables a sufficiently rapid update of the data-loading device 14 after a clearance of a software configuration 12; typically an hourly update would be adequate, in special cases, however, it can advantageous to choose a shorter interval, for example every minute. In an alternative embodiment it is possible to trigger the update manually so that there is no need to wait for the preset interval every time.

For planned maintenance work on an aircraft the relevant aircraft 30 is taken out of operation for the corresponding maintenance period. The planned maintenance work is allocated by individual work orders to the maintenance technicians. This also applies to the maintenance technician operating the data-loading device 14. The operator then generally receives the order to update the software configuration 12 of the aircraft 30 and simply acquires the specified data-loading device 14 which said operator transports into the aircraft 30 and connects to the corresponding connection point 35.

Figure 2:
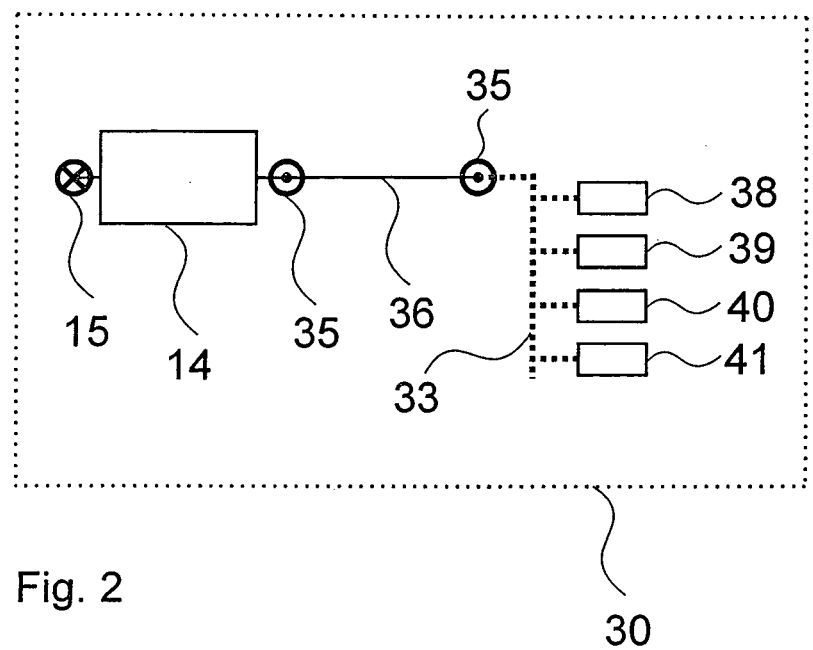
FIG. 2 shows a schematic representation of the data-loading system with a data-loading device connected to an aircraft.

FIG. 2 shows the data-loading device 14 after being transported into the aircraft 30. The data-loading device 14 is connected to the data bus 33 of the aircraft 30 via a cable-connected data bus connection 36 between data bus connections or connection points 35. Operation of the data-loading device 14 with an internal energy source is advantageous, enabling an operation that is independent of the external power sources during the loading process into the electronic system of the aircraft 30. In an alternative embodiment the data-loading device 14 can be operated by an external power source.

In one possible embodiment the operator selects the specified software configuration 12 for said aircraft 30 on the basis of the work order and starts the data transfer of the software configuration 12 into the data bus 33 of the aircraft 30. In this way the individual electronic components 38, 39, 40, 41, . . . , e.g. flight control device, autopilot, navigation and radio devices, are provided with their updated, latest software version and/or database update or their updated software package 18, 19, 20, 21, . . .

In an alternative embodiment the data-loading device 14 identifies the aircraft 30 after connection to the data bus 33 and suggests to the operator the corresponding software configuration 12 for loading into the electronic system or electronic components 38, 39, 40, 41, . . . of the aircraft 30. The operator matches said software configuration 12 with their work order and starts the loading process of the software configuration 12 into the various electronic components 38, 39, 40, 41, . . . of the aircraft 30.

The electronic components 38, 39, 40, 41, . . . of an aircraft comprise the purely electronic systems, and also the mechanical, hydraulic, pneumatic or electrical systems in the aircraft 30, which have an electronic component e.g. for control or data detection and are able to communicate by means of a data bus 33.

In a continuation of the alternative embodiment the data-loading device 14 recognises the aircraft 30 after connection to the data bus 33 and automatically starts the transfer of the software configuration 12. In this embodiment it is advantageous if the data-loading device 14 checks before the transfer to the aircraft 30 whether the data-loading device 14 has a newer software configuration 12 than the aircraft 30.

In an advantageous embodiment the data-loading device 14 records the data transfer of the software configuration 12 and stores said report for a feedback response about the performed data transfer to the database system 11. In addition, a complete copy of the transferred software configuration 12 can be stored on the data-loading device 14.

After the data transfer the data-loading device 14 reports to the operator the success of the update or displays any errors in a suitable manner. The operator signs off or confirms the successful completion on their work order and removes the data-loading device 14 from the aircraft 30.

The completed work order is sent to the relevant configuration control station and the operator of the data-loading device 14 hands over their operating device, the data-loading device 14, for example at the tool storage station, where it is reconnected to the storage position 13.

The data-loading device 14 can thus be loaded again at the next interval with another, new software configuration 12. The loading process with the data-loading system 10 is thereby concluded.

In one advantageous embodiment the reports about transfers of the software configuration 12 since the last connection to the storage position 13 are sent to the database system 11, and can be compared there with input data from the work order.

In a further advantageous embodiment the report of the transfer of a software configuration 12 and/or a copy of the transferred software configuration 12 to the database system 11 of the data-loading system 10 are loaded and used for an electronically supported configuration check of the software configurations 12 of an aircraft fleet, which enables a very efficient and detailed configuration check. In modern aircraft models with an increasing number and complexity of electronic components 38, 39, 40, 41, . . . this is particularly advantageous compared to a manual transfer confirmation for each individual electronic component 38, 39, 40, 41, . . . . The configuration check can be performed advantageously in one possible embodiment using a software application in the database system 11, so that it is possible to verify and check at any time which software configuration 12 is located on an aircraft 30 of a fleet. It is therefore unnecessary to perform a detailed, manual entry of transferred or loaded software configurations 12 consisting of a plurality of software packages 18, 19, 20, 21, . . . of a work order into a separate database. Verification by the work order of the general transfer of a specific software configuration 12 is expedient however, in order avoid problems caused by the failure of a data-loading device 14 after transmission or a severely delayed transfer back of the data-loading device 14 into the storage position 13.

Alternatively, to complete the work order it may be necessary to reconnect the data-loading device 14 to the storage position 13. In addition, it is also possible after connection to the storage position 13 for the transfer protocol on the data-loading device 14 to be confirmed by the operator. In this way the clear verification can be improved further.

In one possible embodiment all of the latest individual software configurations 12, which have been cleared for transfer into an aircraft 30, are stored on the data-loading device(s) 14, in the same way that they are also stored on the database system 11. Therefore, on a data-loading device 14 for each aircraft 30 of a fleet at least one software configuration 12 would be stored, regardless of whether the software configuration 12 had already been loaded onto the corresponding aircraft 30.

In an alternative embodiment the current individual software configuration 12 can be considered to be the software configuration 12 which has been cleared but not yet transferred to the corresponding aircraft 30. The software configuration 12, which has already been transferred to a specific aircraft 30, could thus be deleted from all data-loading devices 14 of the data-loading system 10, as soon as the transfer to the respective aircraft 30 has been confirmed by an electronic transfer protocol and/or a confirmed work order. In this way the required storage space on the storage medium of the data-loading device 14 could be much reduced, which is a particular advantage for a large fleet of aircraft 30.

In a possible embodiment the data-loading system 10 comprises a software application for importing and distributing the software configuration 12 or software to be loaded directly to the data-loading device 14 without further media breaks.

A fleet of aircraft 30 can in this case be the fleet of an airline company, or part of said fleet, or a fleet of aircraft 30 serviced by a maintenance operation. Furthermore, a fleet can also be only a partial fleet consisting of one aircraft model of an airline company.

Figure 3:
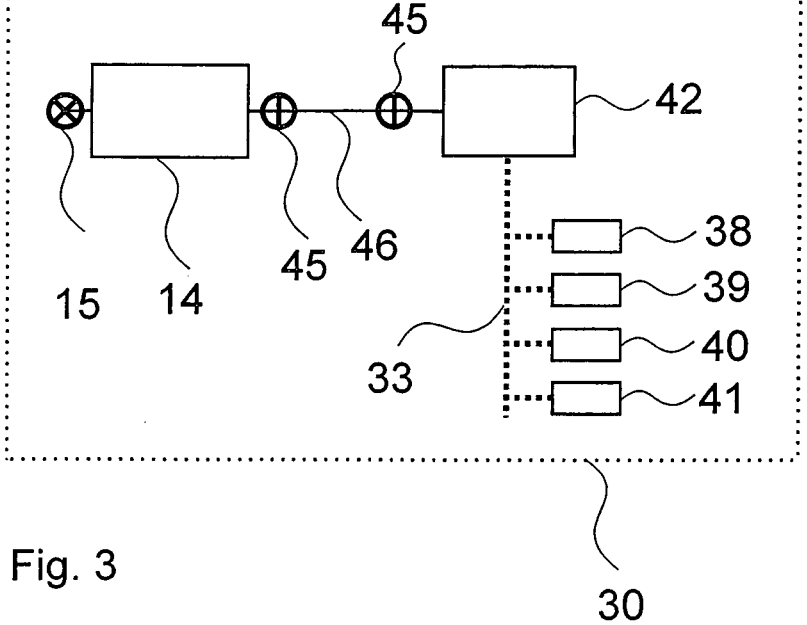
FIG. 3 shows a schematic representation of the data-loading system with a data-loading device connected to an aircraft by means of a data loader.

FIG. 3 shows an alternative embodiment for loading a software configuration 12 into the electronic components 38, 39, 40, 41, . . . of an aircraft 30. The aircraft 30 in this embodiment has a permanently installed data loader 42, which is intended to be used in this case for transferring the software configuration 12 into the data bus 33. The data-loading device 14 is connected to the data loader 42 after transport into the aircraft 30 via the transfer connections 45 by a data transfer connection 46. The transfer of the various software packages 18, 19, 20, 21, . . . of the software configuration 12 is thus performed by the data loader 42 into the different electronic components 38, 39, 40, 41, . . . of the aircraft 30. In this way the function of a permanently installed data loader 42 with a connection to the data bus 33 of the aircraft 30 can be used with the advantages of the data-loading system 10 according to the invention. This is practical as long as no other connection to the data bus 33 of the aircraft 30 is easily accessible, for example.

The invention claimed is:

1. A data-loading system for loading software configurations into electronic components of aircraft, comprising:
   a database system,
   wherein the database system is configured to store a plurality of software configurations corresponding to a plurality of aircraft;
   a ground-based storage position,
   wherein the ground-based storage position is connected to the database system; and
   at least one data-loading device,
   wherein each data-loading device of the at least one data-loading device is transportable from the ground-based storage position to one or more aircraft of the plurality of aircraft,
   wherein the each data-loading device of the at least one data-loading device comprises a processor,
   wherein the each data-loading device of the at least one data-loading device is configured to connect to the ground-based storage position via a data connection such that the database system can transmit data to the each data-loading device of the at least one data-loading device,
   wherein the data-loading system is configured such that, when the plurality of software configurations are stored on the database system, and the each data-loading device of the at least one data-loading device is connected to the ground-based storage position via the data connection, the plurality of software configurations stored on the database system are transmitted from the database system to the each data-loading device of the at least one data-loading device via the data connection and the plurality of software configurations transmitted from the database system to the each data-loading device of the at least one data-loading device are stored on the each data-loading device of the at least one data-loading device,
   wherein, when the plurality of software configurations transmitted from the database system are stored on the each data-loading device of the at least one data-loading device, the each data-loading device of the at least one data-loading device is configured to connect to a transfer connection point of an aircraft of the plurality of aircraft such that either:
   (i) the each data-loading device of the at least one data-loading device connects to the transfer connection point of the aircraft of the plurality of aircraft via a data bus connection and transmits a software configuration of the plurality of software configurations stored on the each data-loading device of the at least one data-loading device corresponding to the aircraft of the plurality of aircraft into a data bus of the aircraft of the plurality of aircraft via the data bus connection; or
   (ii) the each data-loading device of the at least one data-loading device connects to the transfer connection point of the aircraft of the plurality of aircraft via a data transfer connection and transmits a software configuration of the plurality of software configurations stored on the each data-loading device of the at least one data-loading device corresponding to the aircraft of the plurality of aircraft to a data loader installed on the aircraft of the plurality of aircraft via the data transfer connection, and
   wherein the each data-loading device of the at least one data-loading device is configured to identify the aircraft of the plurality of aircraft when the each data-loading device of the at least one data-loading device is connected to the transfer connection point of the aircraft of the plurality of aircraft.

2. The data-loading system according to claim 1,
wherein, when the plurality of software configurations transmitted from the database system are stored on the each data-loading device of the at least one data-loading device, the each data-loading device of the at least one data-loading device is configured to connect to the transfer connection point of the aircraft of the plurality of aircraft such that the each data-loading device of the at least one data-loading device connects to the transfer connection point of the aircraft of the plurality of aircraft via the data bus connection and transmits the software configuration of the plurality of software configurations stored on the each data-loading device of the at least one data-loading device corresponding to the aircraft of the plurality of aircraft into the data bus of the aircraft of the plurality of aircraft via the data bus connection.

3. The data-loading system according to claim 2,
wherein each software configuration of the plurality of software configurations includes a corresponding one or more individual software packages corresponding to one or more electronic components of the aircraft of the plurality of aircraft that the each software configuration corresponds to, and
wherein the each data-loading device of the at least one data-loading device is configured such that, when the plurality of software configurations transmitted from the database system are stored on the each data-loading device, and the each data-loading device of the at least one data-loading device is connected to the transfer connection point of the aircraft of the plurality of aircraft via the data bus connection, the each data-loading device of the at least one data-loading device automatically transmits the software configuration of the plurality of software configurations stored on the each data-loading device of the at least one data-loading device corresponding to the aircraft of the plurality of aircraft into the data bus of the aircraft of the plurality of aircraft and automatically loads the one or more individual software packages of the software configuration of the plurality of software configurations stored on the each data-loading device of the at least one data-loading device corresponding to the aircraft of the plurality of aircraft transmitted into the data bus of the aircraft into the corresponding one or more electronic components of the aircraft of the plurality of aircraft.

4. The data-loading system according to claim 2, wherein the data bus connection between the each data-loading device of the at least one data-loading device and the transfer connection point of the aircraft of the plurality of aircraft is in the form of a cable connection.

5. The data-loading system according to claim 1, wherein, when the plurality of software configurations transmitted from the database system are stored on the each data-loading device of the at least one data-loading device, the each data-loading device of the at least one data-loading device is configured to connect to the transfer connection point of the aircraft of the plurality of aircraft such that each data-loading device of the at least one data-loading device connects to the transfer connection point of the aircraft of the plurality of aircraft via the data transfer connection and transmits the software configuration of the plurality of software configurations stored on the each data-loading device of the at least one data-loading device corresponding to the aircraft of the plurality of aircraft to the data loader installed on the aircraft of the plurality of aircraft via the data transfer connection.

6. The data-loading system according to claim 5, wherein each software configuration of the plurality of software configurations includes a corresponding one or more individual software packages corresponding to one or more electronic components of the aircraft of the plurality of aircraft that the each software configuration corresponds to, and
wherein, after the each data-loading device of the at least one data-loading device transmits the software configuration of the plurality of software configurations corresponding to the aircraft of the plurality of aircraft to the data loader installed on the aircraft of the plurality of aircraft, the data loader installed on the aircraft of the plurality of aircraft loads the one or more individual software packages of the software configuration transmitted to the data loader installed on the aircraft of the plurality of aircraft into the corresponding one or more electronic components of the aircraft of the plurality of aircraft.

7. The data-loading system according to claim 5, wherein the data transfer connection between the each data-loading device of the at least one data-loading device and the transfer connection point of the aircraft of the plurality of aircraft is in the form of a cable connection.

8. The data-loading system according to claim 1, wherein each software configuration of the plurality of software configurations includes a corresponding one or more individual software packages corresponding to one or more electronic components of the aircraft of the plurality of aircraft that the each software configuration of the plurality of software configurations corresponds to.

9. The data-loading system according to claim 1, wherein the data connection connecting the each data-loading device of the at least one data-loading device to the ground-based storage position allows the each data-loading device of the at least one data-loading device to transmit data to the database system via the data connection, and
wherein the each data-loading device of the at least one data-loading device is configured such that, when the each data-loading device of the at least one data-loading device is connected to the ground-based storage position via the data connection, the each data-loading device of the at least one data-loading device transmits an automatic feedback response regarding implemented loading procedures of the plurality of software configurations to the database system.

10. The data-loading system according to claim 1, wherein data-loading the system is configured such that, when the plurality of software configurations are stored on the database system, and the each data-loading device of the at least one data-loading device is connected to the ground-based storage position via the data connection, the plurality of software configurations stored on the database system are periodically transmitted from the database system to the each data-loading device of the at least one data-loading device connected to the ground-based storage position via the data connection and the plurality of software configurations transmitted from the database system to the each data-loading device of the at least one data-loading device are stored on the each data-loading device of the at least one data-loading device.

11. The data-loading system according to claim 10, wherein an interval between periodical transmissions of the plurality of software configurations stored on the database system from the database system to the each data-loading device of the at least one data-loading device via the data connection is adjustable.

12. The data-loading system according to claim 1, wherein the data connection between the each data-loading device of the at least one data-loading device and the ground-based storage position is in the form of a cable connection.

13. The data-loading system according to claim 1, further comprising:
a ground-based software management system,
wherein the ground-based software management system for the database system is configured such that an electronic configuration check of the plurality of software configurations can be performed by the each data-loading device of the at least one data-loading device.

14. The data-loading system according to claim 1, wherein the each data-loading device of the at least one data-loading device comprises a user interface, and
wherein the software configuration of the plurality of software configurations to be transmitted via the data bus connection into the data bus of the aircraft of the plurality of aircraft is selectable by an operator via the user interface of the each data-loading device of the at least one data-loading device.

15. The data-loading system according to claim 1, wherein the each data-loading device of the at least one data-loading device comprises a user interface, and
wherein the software configuration of the plurality of software configurations to be transmitted via the data transfer connection to the data loader installed on the aircraft of the plurality of aircraft is selectable by an operator via the user interface of the each data-loading device of the at least one data-loading device.

16. The data-loading system according to claim 1, wherein the each data-loading device of the at least one data-loading device comprises at least one input device selected form the group consisting of: a keyboard, a mouse, a touchpad, and a touchscreen.

17. A transportable data-loading device for loading software configurations into electronic components of aircraft, comprising:

a data memory; and a processor, wherein the transportable data-loading device is configured to connect, via a data connection, to a ground-based storage position that is connected to a database system, such that when the transportable data-loading device is connected to the ground-based storage position via the data connection, the database system can transmit data to the transportable data-loading device, wherein the database system is configured to store a plurality of software configurations corresponding to a plurality of aircraft, wherein the transportable data-loading device is configured such that, when the plurality of software configurations are stored on the database system, and the transportable data-loading device is connected to the ground-based storage position via the data connection, the plurality of software configurations stored on the database system are transmitted from the database system to the transportable data-loading device via the data connection and the plurality of software configurations transmitted from the database system to the transportable data-loading device are stored on the transportable data-loading device, wherein, when the plurality of software configurations transmitted from the database system are stored on the transportable data-loading device, the transportable data-loading device is configured to connect to a transfer connection point of an aircraft of the plurality of aircraft such that either:

(i) the transportable data-loading device connects to the transfer connection point of the aircraft of the plurality of aircraft via a data bus connection and transmits a software configuration of the plurality of software configurations stored on the transportable data-loading device corresponding to the aircraft of the plurality of aircraft into a data bus of the aircraft of the plurality of aircraft via the data bus connection; or (ii) the transportable data-loading device connects to the transfer connection point of the aircraft of the plurality of aircraft via a data transfer connection and transmits a software configuration of the plurality of software configurations stored on the transportable data-loading device corresponding to the aircraft of the plurality of aircraft to a data loader installed on the aircraft of the plurality of aircraft via the data transfer connection, and wherein the transportable data-loading device is configured to identify the aircraft of the plurality of aircraft when the transportable data-loading device is connected to the transfer connection point of the aircraft of the plurality of aircraft.

18. The transportable data-loading device for loading software configurations into electronic components of aircraft according to claim 17, wherein, when the plurality of software configurations transmitted from the database system are stored on the transportable data-loading device, the transportable data-loading device is configured to connect to the aircraft of the plurality of aircraft such that the transportable data-loading device connects to the transfer connection point of the aircraft of the plurality of aircraft via the data bus connection and transfers the software configuration of the plurality of software configurations stored on the transportable data-loading device corresponding to the aircraft of the plurality of aircraft into the data bus of the aircraft of the plurality of aircraft via the data bus connection.

19. A method for loading software configurations into the electronic components of aircraft, comprising:

providing a data-loading system, wherein the data-loading system comprises:

a database system, wherein the database system is configured to store a plurality of software configurations corresponding to a plurality of aircraft;

a ground-based storage position, wherein the ground-based storage position is connected to the database system; and at least one data-loading device, wherein each data-loading device of the at least one data-loading device is transportable from the ground-based storage position to one or more aircraft of the plurality of aircraft, wherein the each data-loading device of the at least one data-loading device comprises a processor, wherein the each data-loading device of the at least one data-loading device is configured to connect to the ground-based storage position via a data connection such that the database system can transmit data to the each data-loading device of the at least one data-loading device, wherein the data-loading system is configured such that, when the plurality of software configurations are stored on the database system, and the each data-loading device of the at least one data-loading device is connected to the ground-based storage position via the data connection, the plurality of software configurations stored on the database system are transmitted from the database system to the each data-loading device of the at least one data-loading device via the data connection and the plurality of software configurations transmitted from the database system to the each data-loading device of the at least one data-loading device are stored on the each data-loading device of the at least one data-loading device, wherein, when the plurality of software configurations transmitted from the database system are stored on the each data-loading device of the at least one data-loading device, the each data-loading device of the at least one data-loading device is configured to connect to a transfer connection point of an aircraft of the plurality of aircraft such that either:

(i) the each data-loading device of the at least one data-loading device connects to the transfer connection point of the aircraft of the plurality of aircraft via a data bus connection and transmits a software configuration of the plurality of software configurations stored on the each data-loading device of the at least one data-loading device corresponding to the aircraft of the plurality of aircraft into a data bus of the aircraft of the plurality of aircraft via the data bus connection; or (ii) the each data-loading device of the at least one data-loading device connects to the transfer connection point of the aircraft of the plurality of aircraft via a data transfer connection and transmits a software configuration of the plurality of software configurations stored on the each data-loading device of the at least one data-loading device corresponding to the aircraft of the plurality of aircraft to a data loader installed on the aircraft of the plurality of aircraft via the data transfer connection, and wherein the each data-loading device of the at least one data-loading device is configured to identify the aircraft of the plurality of aircraft when the each data-loading device of the at least one data-loading device is connected to the transfer connection point of the aircraft of the plurality of aircraft;

storing the plurality of software configurations corresponding to the plurality of aircraft in the database system;

connecting a data-loading device of the at least one data-loading device to the ground-based storage position via the data connection such that the database system can transmit data to the data-loading device of the at least one data-loading device;

transmitting the plurality of software configurations stored on the database system from the database system to the data-loading device of the at least one data-loading device via the data connection and storing the plurality of software configurations transmitted from the database system to the data-loading device of the at least one data-loading device on the data-loading device of the at least one data-loading device;

transporting the data-loading device of the at least one data-loading device from the ground-based storage position to the aircraft of the plurality of aircraft;

connecting the data-loading device of the at least one data-loading device to the transfer connection point of the aircraft of the plurality of aircraft such that either:

(i) the data-loading device of the at least one data-loading device connects to the transfer connection point of the aircraft of the plurality of aircraft via the data bus connection and transmits the software configuration of the plurality of software configurations stored on the data-loading device of the at least one data-loading device corresponding to the aircraft of the plurality of aircraft into the data bus of the aircraft of the plurality of aircraft via the data bus connection; or (ii) the data-loading device of the at least one data-loading device connects to the transfer connection point of the aircraft of the plurality of aircraft via the data transfer connection and transmits the software configuration of the plurality of software configurations stored on the each data-loading device of the at least one data-loading device corresponding to the aircraft of the plurality of aircraft to the data loader installed on the aircraft of the plurality of aircraft via the data transfer connection; and identifying the aircraft of the plurality of aircraft when the data-loading device of the at least one data-loading device is connected to the transfer connection point of the aircraft of the plurality of aircraft.

20. The method for loading software configurations into the electronic components of aircraft according to claim 19, wherein the data-loading device of the at least one data-loading device is configured to connect to the transfer connection point of the aircraft of the plurality of aircraft such that the data-loading device of the at least one data-loading device connects to the transfer connection point of the aircraft of the plurality of aircraft via the data bus connection and transmits the software configuration of the plurality of software configurations stored on the data-loading device of the at least one data-loading device corresponding to the aircraft of the plurality of aircraft into the data bus of the aircraft of the plurality of aircraft via the data bus connection.

* * * * *